(12) United States Patent
Lian et al.

(10) Patent No.: US 11,638,885 B2
(45) Date of Patent: May 2, 2023

(54) CUP LID AND SELF-PRODUCING WATER CUP

(71) Applicant: SHENZHEN ZEER ELECTRONIC COMMERCE CO., LTD, Shenzhen (CN)

(72) Inventors: Sunping Lian, Shenzhen (CN); Dongming Li, Foshan (CN); Zhijiang Wu, Foshan (CN)

(73) Assignee: SHENZHEN ZEER ELECTRONIC COMMERCE CO., LTD, Shenzhen (CN)

( * ) Notice: Subject to any disclaimer, the term of this patent is extended or adjusted under 35 U.S.C. 154(b) by 0 days.

(21) Appl. No.: 17/569,534

(22) Filed: Jan. 6, 2022

(65) Prior Publication Data

US 2023/0022498 A1    Jan. 26, 2023

(30) Foreign Application Priority Data

Jul. 23, 2021 (CN) .......................... 202121687724.X
Nov. 4, 2021 (CN) .......................... 202122706906.3

(51) Int. Cl.
*B01D 5/00* (2006.01)
*A45F 3/16* (2006.01)
*E03B 3/32* (2006.01)

(52) U.S. Cl.
CPC .............. *B01D 5/0084* (2013.01); *A45F 3/16* (2013.01); *B01D 5/0015* (2013.01); *B01D 2265/029* (2013.01); *C02F 2307/10* (2013.01); *E03B 3/32* (2013.01)

(58) Field of Classification Search
CPC ...... C02F 2307/10; A45F 3/16; B01D 5/0084; B01D 5/0015; B01D 2265/029; E03B 3/32
USPC ............................................................. 62/93
See application file for complete search history.

(56) References Cited

U.S. PATENT DOCUMENTS

| 4,182,132 | A | * | 1/1980 | Nasser | ..................... F25D 17/00 62/93 |
| 5,951,825 | A | * | 9/1999 | Land | .................... B01D 5/0006 202/83 |
| 2007/0039345 | A1 | * | 2/2007 | Forsberg | ................... E03B 3/28 62/317 |
| 2015/0128483 | A1 | * | 5/2015 | Krupp | ....................... F24D 5/02 126/110 A |

* cited by examiner

Primary Examiner — Akash K Varma

(57) ABSTRACT

The present disclosure provides a cup lid and a self-producing water cup. The cup lid includes: a housing, a condensing mechanism, and a heat dissipation mechanism. The housing defines a housing space, an air inlet, an air outlet, and a water outlet. The air inlet, the air outlet, and the water outlet are connected to an outside. The air inlet, the air outlet, and the water outlet are connected to the housing space. The condensing mechanism is housed in the housing and connected to the air inlet. The condensing mechanism is configured to condense air flowing from the air inlet into water, and the water flows out through the water outlet. The heat dissipation mechanism is housed in the housing and connected to the air outlet. The heat dissipation mechanism is configured to dissipate heat generated by the condensing mechanism.

5 Claims, 11 Drawing Sheets

CUP LID AND SELF-PRODUCING WATER CUP

TECHNICAL FIELD

The present disclosure relates to the field of cup technologies, and in particular to a cup lid and a self-producing water cup.

BACKGROUND

In order to ensure human health, the human body must consume a certain amount of water every day. However, in a case of being in the wild without water or in conditions of drought and water shortage, the human body may suffer a series of physical discomfort due to lack of water.

SUMMARY OF THE DISCLOSURE

In response to the above-mentioned defects of the prior art, the present disclosure provides a cup lid and a self-producing water cup using the cup lid to solve the technical problem of water scarcity in outdoor or water-scarce areas.

To solve the above technical problems, the present disclosure provides a cup lid, including: a housing, defining a housing space, an air inlet, an air outlet, and a water outlet; wherein the air inlet, the air outlet, and the water outlet are communicated to an outside; the air inlet, the air outlet, and the water outlet are communicated to the housing space; a condensing mechanism, received in the housing and communicated to the air inlet; wherein the condensing mechanism is configured for condensing air flowing from the air inlet into water, and the water flows out through the water outlet; and a heat dissipation mechanism, received in the housing and communicated to the air outlet; wherein the heat dissipation mechanism is configured for dissipating heat generated by the condensing mechanism.

To solve the above technical problems, the present disclosure further provides a cup, capable of self-producing water and including: the cup lid as described above; and a cup body, defining a liquid storage chamber and a cup opening connected to the liquid storage chamber; wherein the cup body is removably connected to the cup lid.

According to the present disclosure, the water produced by the condensing air of the condensing mechanism in the present disclosure can be collected to achieve the function of accumulating water storage, which can be consumed when drinking water is needed and is convenient and quick to use, making it possible to drink water in the field without carrying water or in areas where water is scarce. The heat dissipation mechanism can be used to dissipate heat, which in turn makes the work of the cup lid more stable.

BRIEF DESCRIPTION OF THE DRAWINGS

In order to more clearly illustrate the scheme of the present disclosure, a brief description of the accompanying drawings to be used in the description of the embodiments will be given below. It is obvious that the accompanying drawings in the following description are some of the embodiments of the present disclosure, and other accompanying drawings can be obtained according to them without any creative work for those skilled in the art.

ATTACHMENT MARKS

100, Self-producing water cup; 10, Cup body; 11, Liquid storage chamber; 12, Cup opening; 20, Cup lid; 21, Housing; 22, Air inlet; 23, Air outlet; 24, Water outlet; 30, First bracket; 31, Water collection port; 32, First mounting plate; 321, Fixing hole; 33, Second mounting plate; 34, Third mounting plate; 35, Circulation hole; 40, Condensing mechanism; 41, Cooling member; 412, Condensing body; 414, Condensing sheet; 42, Semiconductor cooling sheet; 50, Filter; 60, Second bracket; 70, Heat dissipation mechanism; 71, Heat dissipation member; 72, Heat dissipation body; 73, Heat dissipation fin; 74, Heat dissipation fan; 80, Temperature detector.

DETAILED DESCRIPTION

Unless otherwise defined, all technical and scientific terms used herein have the same meaning as commonly understood by those skilled in the art belonging to the present disclosure. The terms used herein in the specification of the present disclosure are intended only for the purpose of describing specific embodiments and are not intended to limit the present disclosure. The terms "include" and "have", and any variations thereof, are intended to cover non-exclusive inclusion. The terms "first", "second", etc. in the specification, claims, and the accompanying drawings of the present disclosure are intended to distinguish between different objects and are not intended to describe a particular order.

References herein to "embodiment" mean that particular features, structures or characteristics described in connection with an embodiment may be included in at least one embodiment of the present disclosure. The occurrence of the phrase at various points in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

Embodiment 1

Figure 1:
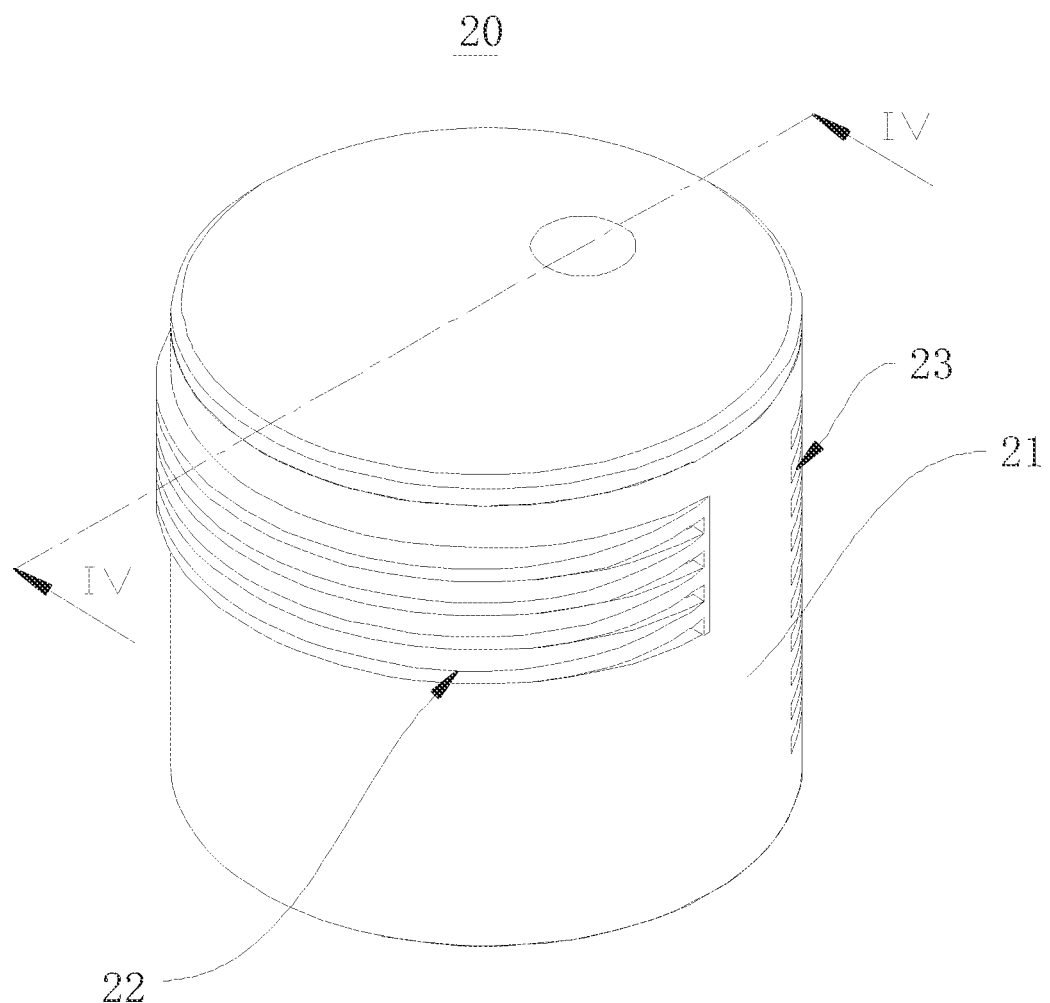
FIG. 1 is a perspective structural schematic view of a cup lid according to an embodiment of the present disclosure.
Figure 2:
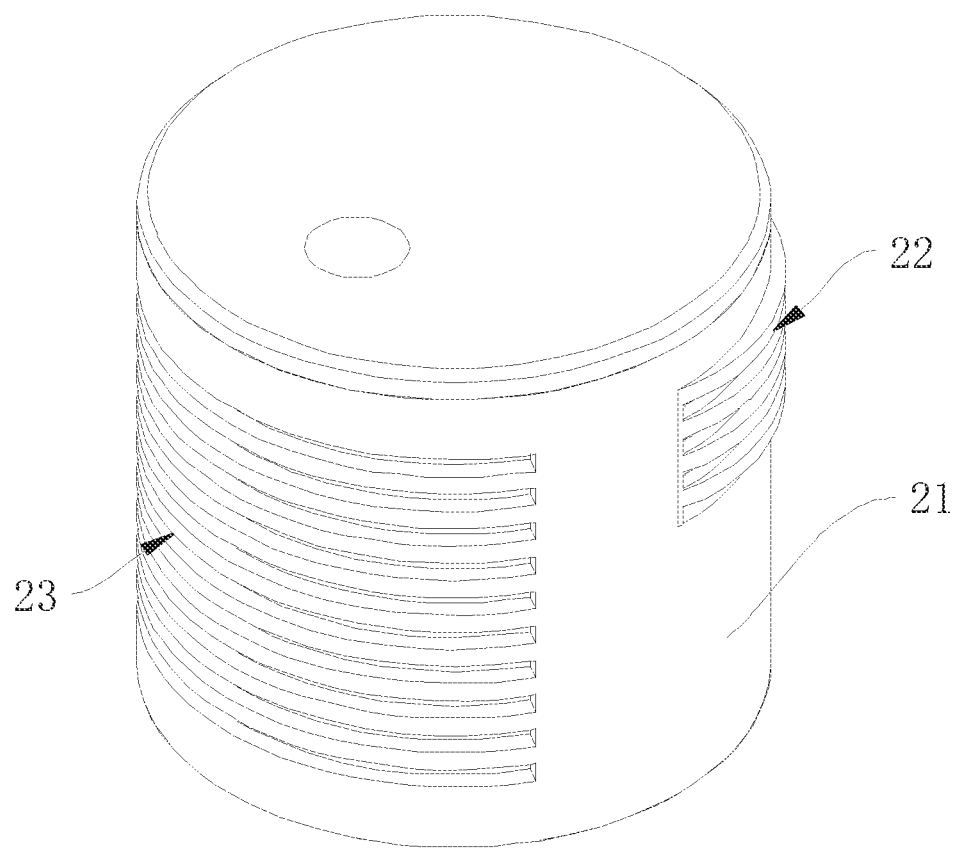
FIG. 2 is another perspective structural schematic view of the cup lid shown in FIG. 1.
Figure 3:
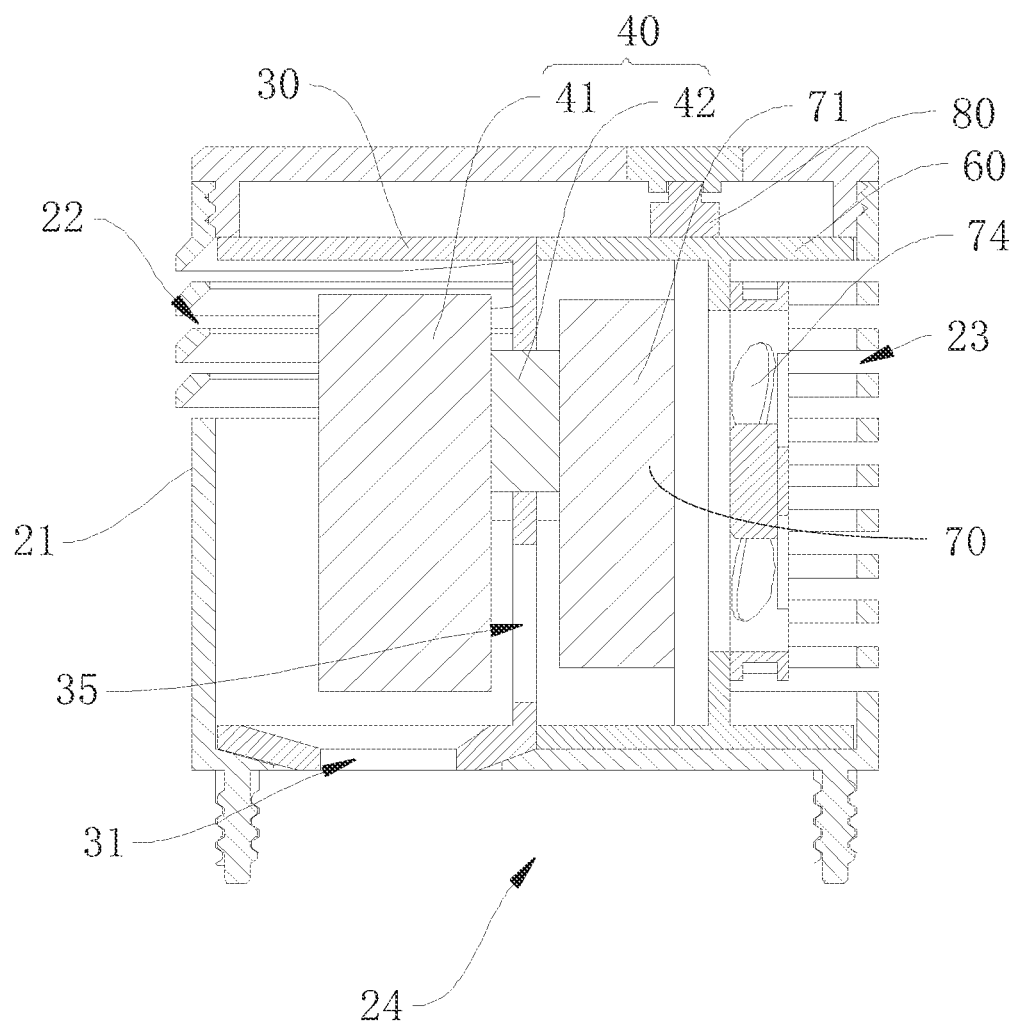
FIG. 3 is a cross-sectional structural schematic view of the cup lid shown in FIG. 1.
Figure 4:
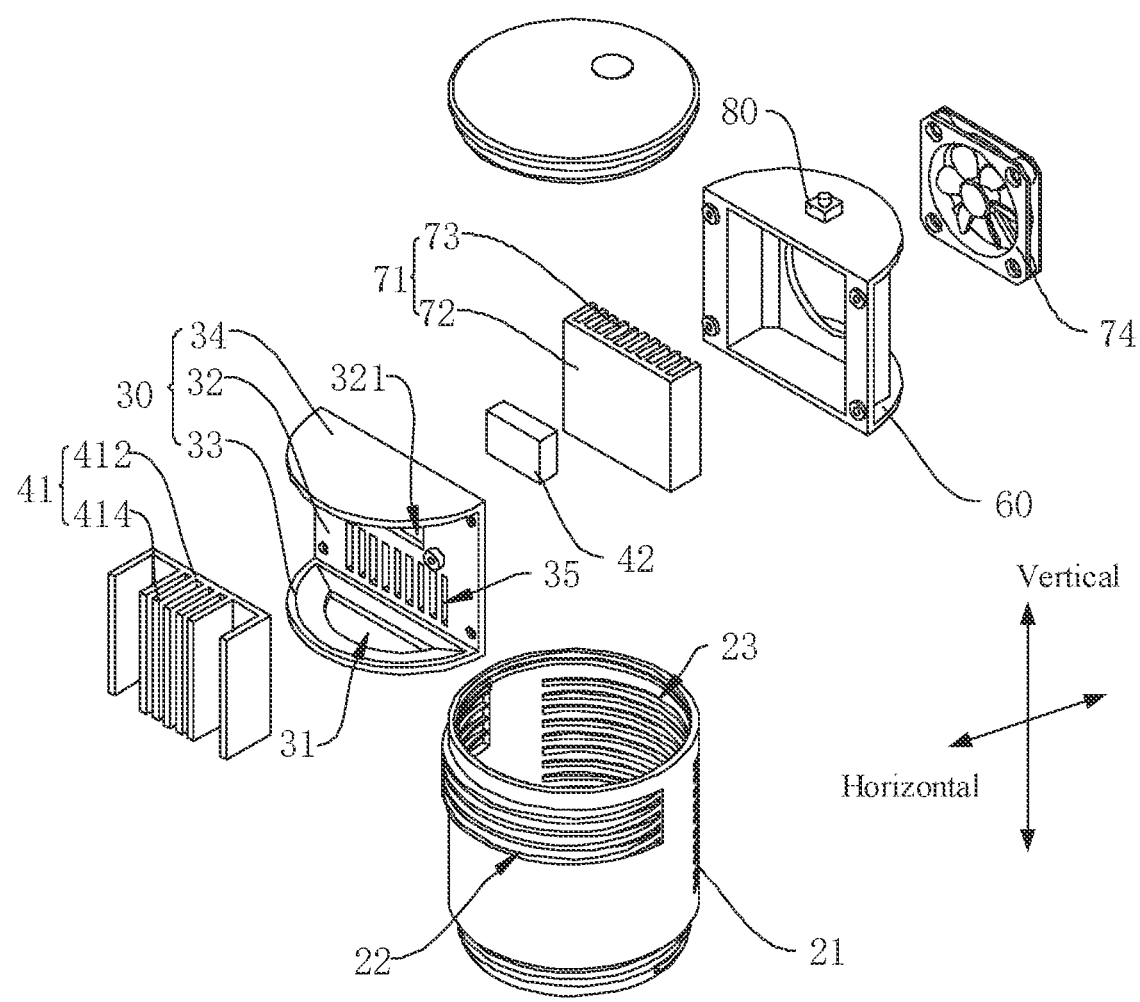
FIG. 4 is an exploded structural schematic view of the cup lid shown in FIG. 1.

The present disclosure provides a cup lid 20. Referring to FIGS. 1 to 4, FIG. 1 is a perspective structural schematic view of a cup lid according to an embodiment of the present disclosure, FIG. 2 is another perspective structural schematic view of the cup lid shown in FIG. 1, FIG. 3 is a cross-sectional structural schematic view of the cup lid shown in FIG. 1, and FIG. 4 is an exploded structural schematic view of the cup lid shown in FIG. 1. The cup lid 20 includes a housing 21, a condensing mechanism 40 and a heat dissipation mechanism 70. The housing 21 defines a housing space and an air inlet 22, an air outlet 23 and a water outlet 24 communicated to an outside. The air inlet 22 and the air outlet 23 and the water outlet 24 are connected to the housing space. The condensing mechanism 40 is housed in the housing 21 and is communicated to the air inlet 22. The condensing mechanism 40 is configured for condensing air flowing from the air inlet 22 into water, and the water flows out through the water outlet 24. The heat dissipation mechanism 70 is housed in the housing 21 and is communicated to the air outlet 23. The heat dissipation mechanism 70 is configured for dissipating heat generated by the condensing mechanism 40.

In summary, the water generated by the condensing mechanism 40 condensing air in the embodiment of the present disclosure may be collected to achieve the function of accumulating water storage. In this way, the water can be consumed when drinking water is needed, which is convenient and quick to use, making it possible to drink water in the field without carrying water or in areas where water is scarce. The heat dissipation mechanism 70 may be configured for dissipating heat, which in turn makes the work of the cup lid 20 more stable.

Further, as shown in FIGS. 3 and 4, the condensing mechanism 40 includes a cooling member 41 and a semiconductor cooling sheet 42. The semiconductor cooling sheet 42 has a cold end and a hot end. The cooling member 41 is arranged at the cold end and above the water outlet 24.

The semiconductor cooling sheet 42, also called a thermoelectric cooling sheet, is a heat pump. It has the advantage of having no sliding parts and can be used in applications where space is restricted, reliability is required, and there is no refrigerant contamination. By virtue of Peltier effect of semiconductor materials, when direct-current electricity is passed through an electric couple formed by two different semiconductor materials connected in series, heat may be absorbed at an end of the electric couple and be released at the other end of the electric couple, which can achieve the purpose of cooling. It is a cooling technology that generates negative thermal resistance and is characterized by high reliability and the absence of moving parts. With the semiconductor cooling sheet 42, the structural complexity of the cup lid 20 may be reduced, and the cup lid 20 may be more compact and portable.

The cooling member 41 is in contact with the cold end such that a lower temperature can be obtained. The air in flow may be condensed to form water droplets adhering to the cooling member 41 when it comes into contact with the cooling member 41. When the water accumulates to a certain amount, the water may be detached from the cooling member 41 and discharged through the water outlet 24.

In some embodiments, as shown in FIG. 4, the cooling member 41 may include a condensing body 412 and a condensing sheet 414. The condensing body 412 is in contact with the semiconductor cooling sheet 42 to increase a contact area between the condensing body 412 and the semiconductor cooling sheet 42, thereby increasing a heat transfer efficiency. The condensing sheet 414 is arranged on a side of the condensing body 412 back from the semiconductor cooling sheet 42 to increase a contact area between the cooling member 41 and the air, thereby condensing more air.

Further, a plurality of condensing sheets 414 may be arranged. The plurality of condensing sheets 414 are in the shape of straight plates and are arranged at parallel intervals, such that the liquid formed by condensation can easily flow down into the water outlet 24.

Figure 5:
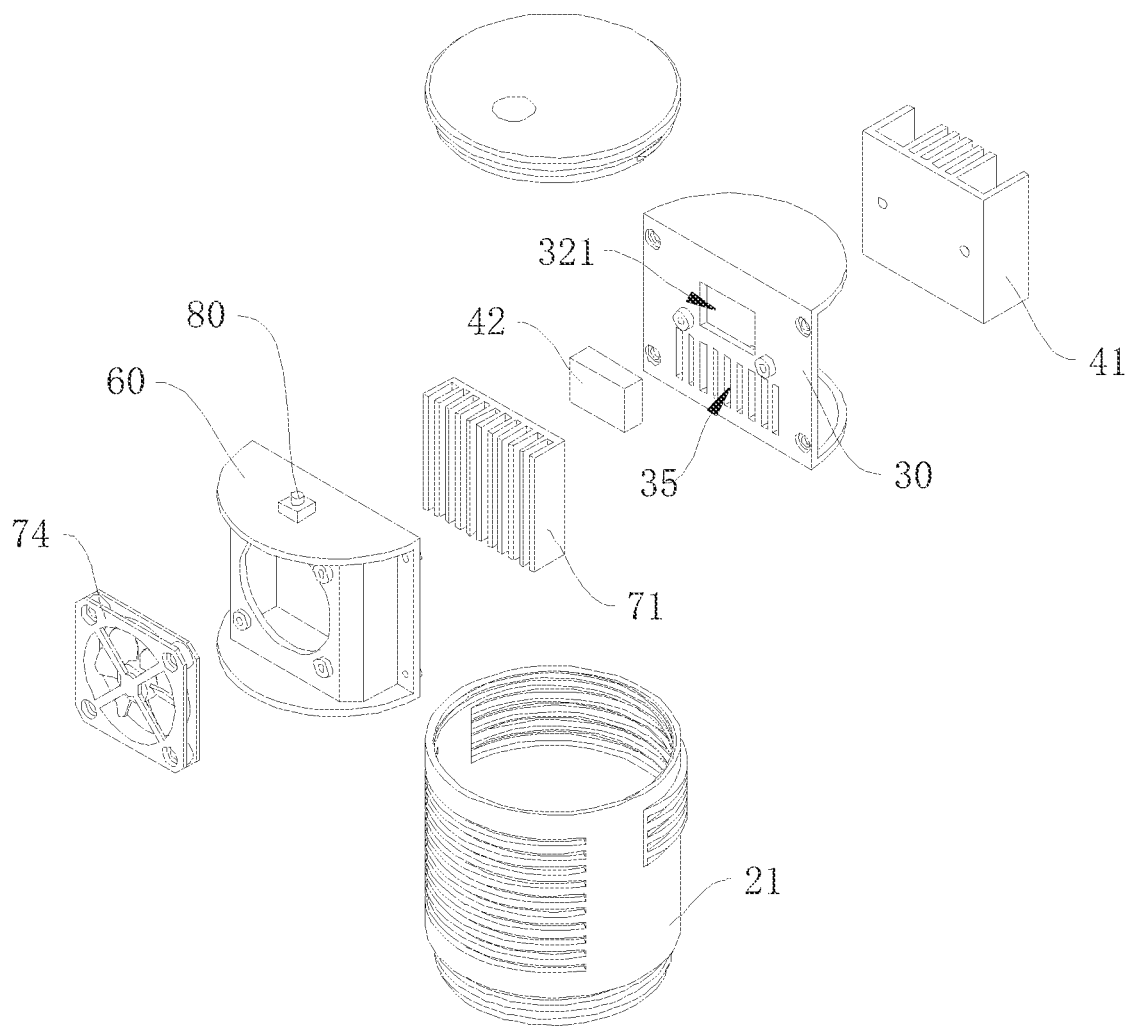
FIG. 5 is another exploded structural schematic view of the cup lid shown in FIG. 1.

In some embodiments, FIG. 5 is another exploded structural schematic view of the cup lid shown in FIG. 1. The heat dissipation mechanism 70 includes a heat dissipation member 71 arranged at the hot end. The heat dissipation member 71 is in contact with the hot end, such that heat may be dissipated from the hot end to improve the stability of the semiconductor cooling sheet 42.

The heat dissipation member 71 includes a heat dissipation body 72 and a heat dissipation fin 73. The heat dissipation body 72 is in contact with the semiconductor cooling sheet 42 to increase a contact area between the heat dissipation body 72 and the semiconductor cooling sheet 42, thereby increasing the heat transfer efficiency. The heat dissipation fin 73 is arranged on a side of the heat dissipation body 72 back from the semiconductor cooling sheet 42 to increase a contact area between the heat dissipation fin 73 and the air, thereby improving the heat dissipation efficiency of the heat dissipation member 71.

Further, a plurality of heat dissipation fins 73 may be arranged. The plurality of heat dissipation fins 73 are in the shape of straight plates and are arranged at parallel intervals, such that a heat dissipation flow channel may be formed between adjacent heat dissipation fins 73 to improve the heat dissipation efficiency.

Further, as shown in FIGS. 3 and 4, the cup lid 20 includes a first bracket 30, and the condensing mechanism 40 and the heat dissipation mechanism 70 are arranged on the first bracket 30. That is, the first bracket 30 is configured to fix the condensing mechanism 40 to the cup lid 20.

Specifically, as shown in FIGS. 3 to 5, the first bracket 30 includes a first mounting plate 32 and a second mounting plate 33. A plane in which the first mounting plate 32 is located is parallel to a connection direction of a cup body 10 and the cup lid 20. The second mounting plate 33 is connected to the first mounting plate 32, and a plane in which the second mounting plate 33 is located is perpendicular to the plane in which the first mounting plate 32 is located. The cooling member 41 is arranged on the first mounting plate 32 and a water collection port 31 is defined on the second mounting plate 33.

Specifically, the first mounting plate 32 is arranged along a vertical direction shown in FIG. 4, and the second mounting plate 33 is arranged along a horizontal plane shown in FIG. 4. The size of an opening of the water collection port 31 on a side facing the first bracket 30 is larger than the size of an opening of the water collection port 31 on a side facing the cup body 10, thereby allowing the condensate to flow into the liquid storage chamber 11 after pooling.

In some embodiments, the first mounting plate 32 and the second mounting plate 33 may be arranged with a one-piece structure to reduce the number of components and facilitate installation and removal.

Further, the first bracket 30 may further include a third mounting plate 34. The third mounting plate 34 and the second mounting plate 33 are arranged at intervals on opposite sides of the first mounting plate 32. The third mounting plate 34 abuts against a top wall of the cup lid 20 to keep the first bracket 30 fixed.

As shown in FIGS. 4 and 5, the first mounting plate 32 defines a fixing hole 321, and the semiconductor cooling sheet 42 is stuck in the fixing hole 321. The heat dissipation 71 and the cooling member 41 are respectively arranged on opposite sides of the first mounting plate 32 and are respectively in contact with the semiconductor cooling sheet 42. In this way, the first mounting plate 32 may be configured to space out the heat dissipation member 71 and the cooling member 41 to prevent heat crossing each other and reducing the cooling capacity of the cooling member 41.

Further, as shown in FIGS. 3 to 5, the cup lid 20 further includes a second bracket 60 and a heat dissipation fan 74. The second bracket 60 is received in the housing space and on a side of the heat dissipation member 71. The heat dissipation fan 74 is arranged on the second bracket 60 and faces the heat dissipation member 71.

Specifically, the second bracket 60 is connected to a side of the first bracket 30 facing the heat dissipation member 71 for fixing the heat dissipation fan 74. The heat dissipation fan 74 is arranged directly opposite to the heat dissipation member 71 for transferring heat from the heat dissipation member 71 to the outside of the cup lid 20, thereby enhancing the heat dissipation performance of the cup lid 20.

Further, in order to prevent damage to components caused by the long working time of the cup lid 20, the cup lid 20 may include a temperature detector 80 arranged on the cup lid 20 and adjacent to the heat dissipation mechanism 70. The temperature detector 80 is configured to detect the temperature of the heat dissipation member 71 to control the cooling member 41 to stop working when the temperature of the heat dissipation member 71 is high, thereby preventing damage to the cup lid 20.

As shown in FIGS. 1 to 5, the air inlet 22 and the air outlet 23 are defined on the cup lid 20, with the air inlet 22 arranged adjacent to the cooling member 41 and the air outlet 23 arranged adjacent to the heat dissipation fan 74. In this way, outside air may enter the cup lid 20 through the air inlet 22 and come into contact with the cooling member 41 arranged adjacent to the air inlet 22, and the cooling member 41 may condense the water vapor in the air to form condensate. When the heat dissipation fan 74 rotates, it generates negative pressure on a side of the heat dissipation member 71, and the negative pressure drives the heat to flow and out through the air outlet 23.

In some embodiments, the air inlet 22 may be a strip-shaped hole, and the strip-shaped hole is defined along a circumference of the cup lid 20 on the side of the cup lid 20 facing the first bracket 30. Further, the air inlet 22 may be an oblique hole to reduce the probability of external impurities entering the housing space via the air inlet 22.

In some embodiments, the air inlet 23 may be a strip-shaped hole, and the strip-shaped hole is defined along a circumference of the cup lid 20 on a side of the cup lid 20 facing the second bracket 60.

Further, since the cooling member 41 and the heat dissipation member 71 are arranged along a direction perpendicular to the connection direction of the cup body 10 and the cup lid 20, the air inlet 22 and the air outlet 23 are defined on the side wall of the cup lid 20 to reduce the distance between the air inlet 22 and the cooling member 41 and reduce the distance between the air outlet 23 and the heat dissipation member 71.

In some embodiments, as shown in FIGS. 4 and 5, a circulation hole 35 is defined on the first bracket 30. The circulation hole 35 connects a side where the cooling member 41 is located and a side where the heat dissipation member 71 is located, thereby forming a convection flow channel in the cup lid 20 to facilitate the flow of gas. In this way, under the negative pressure generated by the heat dissipation fan 74 on the side of the heat dissipation member 71, the flow of gas may be accelerated, and the air inlet speed of the air inlet 22 may be improved, thereby enhancing the condensation and water storage speed.

Embodiment 2

Figure 6:
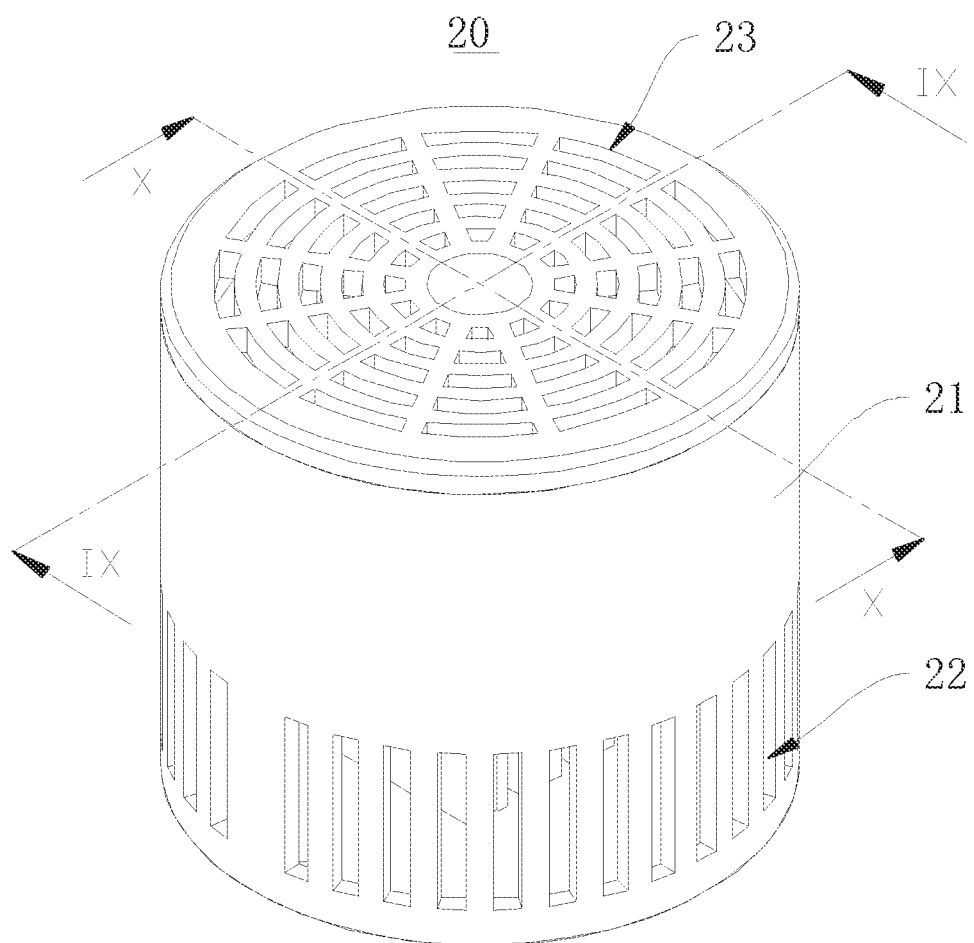
FIG. 6 is a perspective structural schematic view of a cup lid according to another embodiment of the present disclosure.
Figure 7:
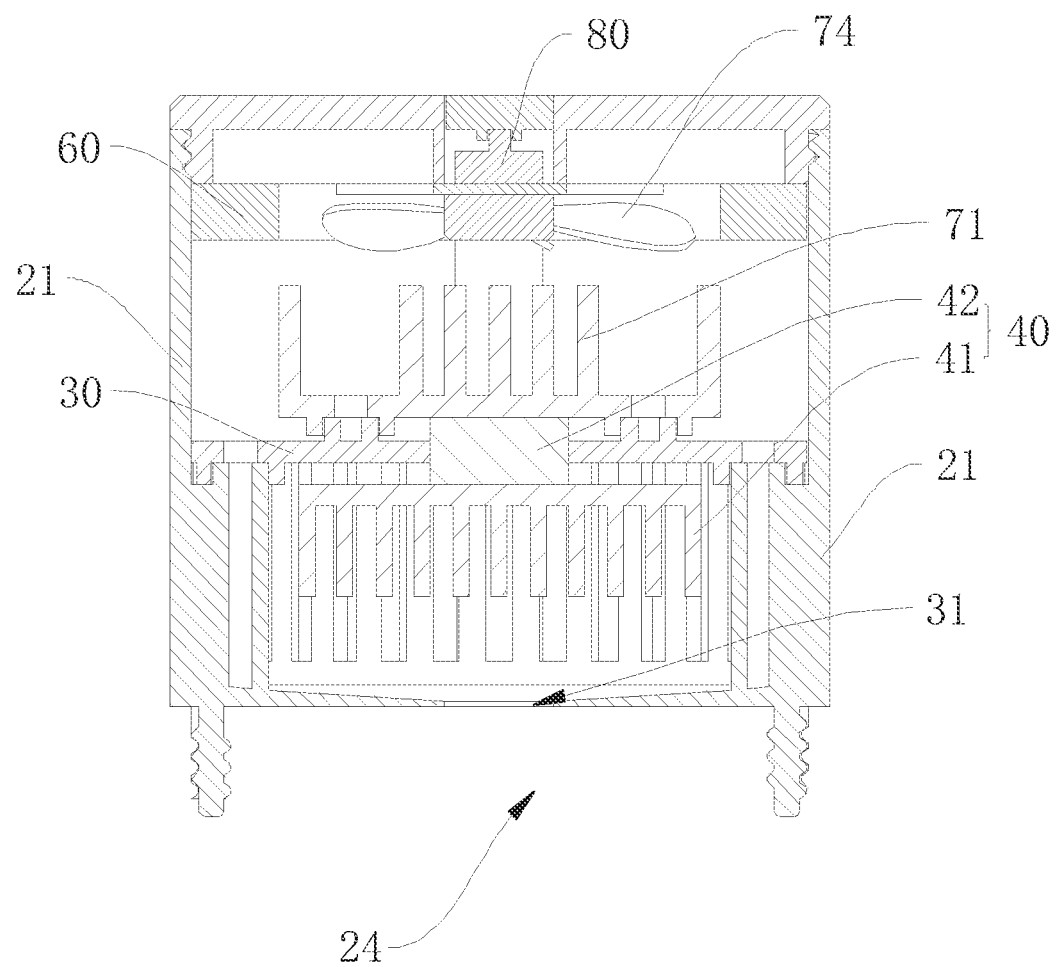
FIG. 7 is a cross-sectional structural schematic view of the cup lid shown in FIG. 6.
Figure 8:
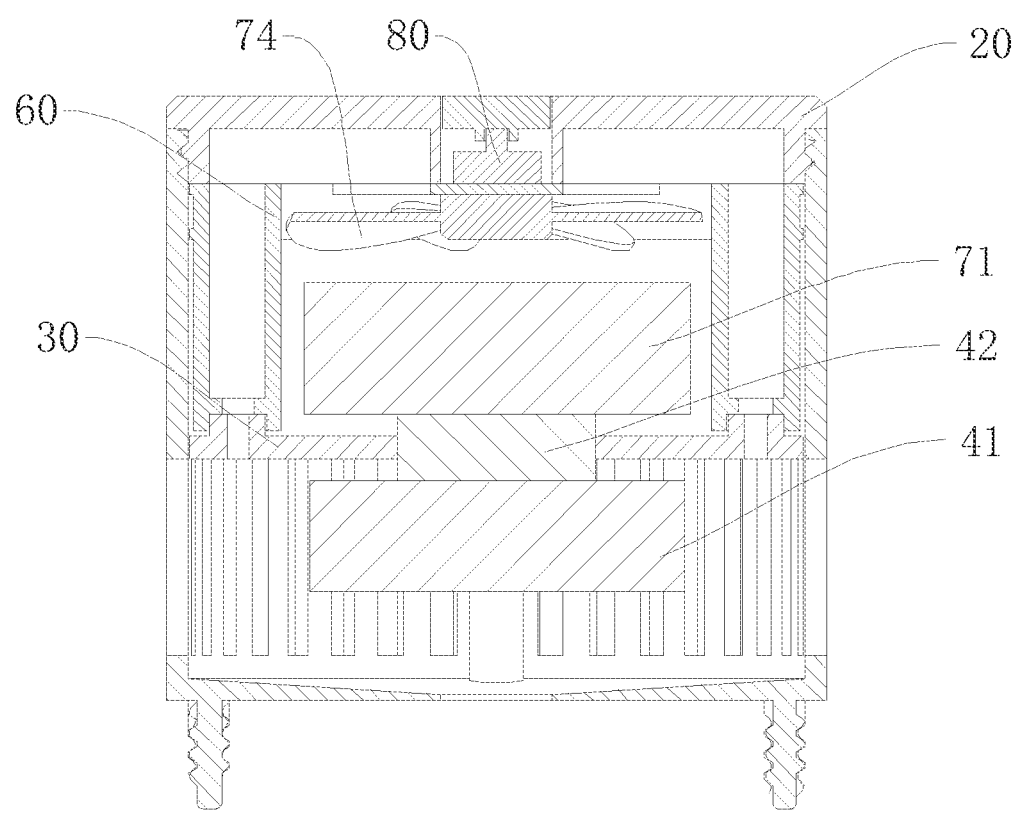
FIG. 8 is another cross-sectional structural schematic view of the cup lid shown in FIG. 6.
Figure 9:
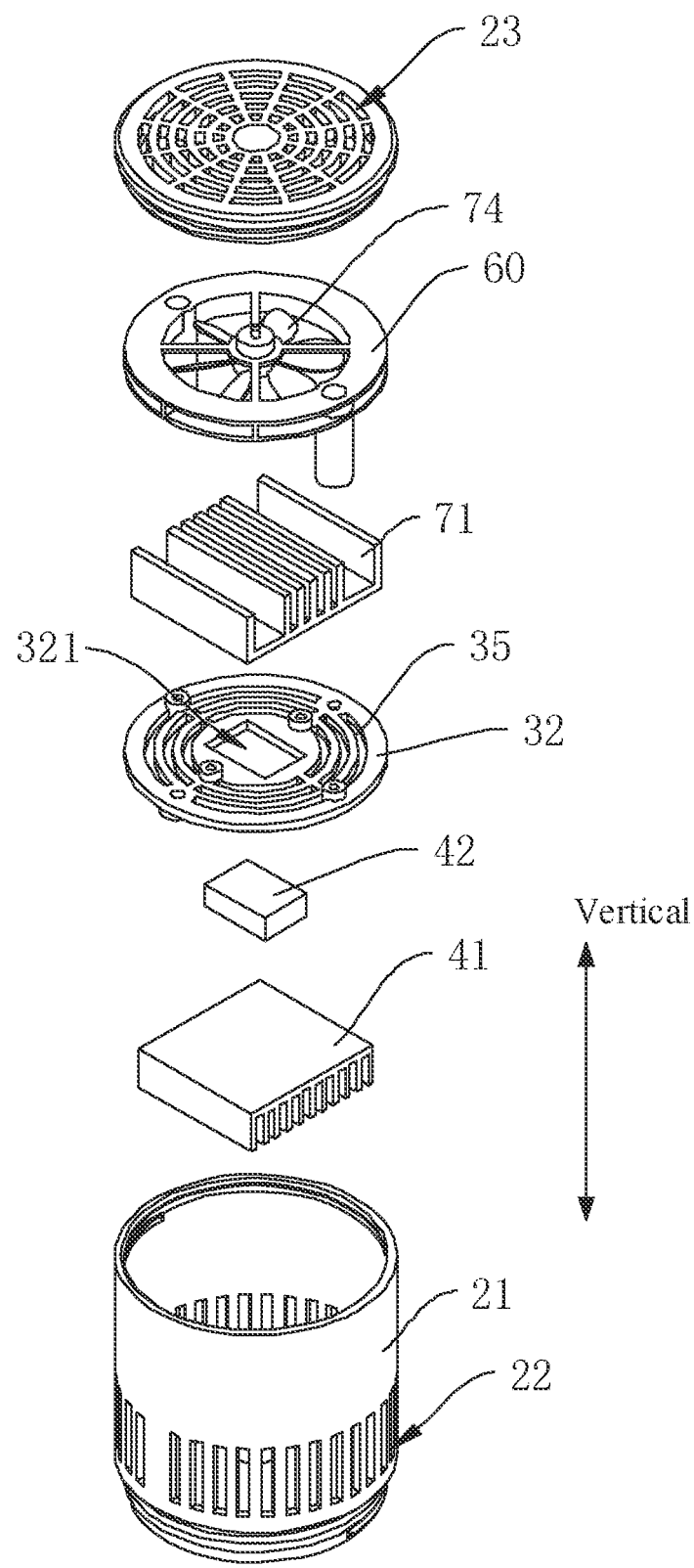
FIG. 9 is an exploded structural schematic view of the cup lid shown in FIG. 6.
Figure 10:
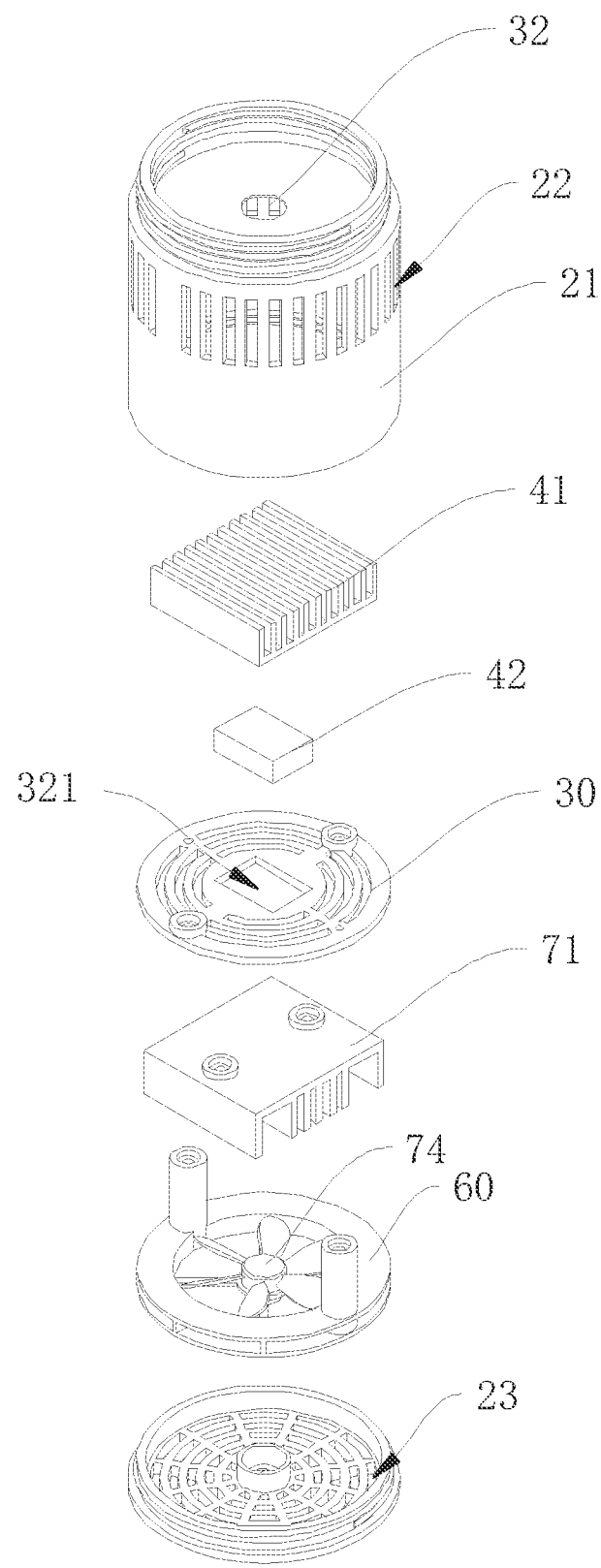
FIG. 10 is another exploded structural schematic view of the cup lid shown in FIG. 6.

Referring to FIGS. 6 to 10, FIG. 6 is a perspective structural schematic view of a cup lid according to another embodiment of the present disclosure, FIG. 7 is a cross-sectional structural schematic view of the cup lid shown in FIG. 6, FIG. 8 is another cross-sectional structural schematic view of the cup lid shown in FIG. 6, FIG. 9 is an exploded structural schematic view of the cup lid shown in FIG. 6, and FIG. 10 is another exploded structural schematic view of the cup lid shown in FIG. 6. The structure of the cup lid in this embodiment is substantially the same as the structure of the cup lid in the Embodiment 1, and only the different technical features are described in detail below.

Specifically, the cooling member 41 and the heat dissipation member 71 in this embodiment are arranged along the connection direction of the cup body 10 and the cup lid 20, i.e., along the vertical direction shown in FIG. 9. The cooling member 41 is arranged on a side of the first bracket 30 near the cup body 10, and the heat dissipation member 71 is arranged on a side of the first bracket 30 back from the cup body 10. The semiconductor cooling sheet 42 is arranged on the first bracket 30 and is in contact with the cooling member 41 and the heat dissipation member 71, respectively.

The first bracket 30 includes only the first mounting plate 32, the plane where the first mounting plate 32 is located is perpendicular to the connection direction of the cup body 10 and the cup lid 20. The shape and size of a cross section of the first mounting plate 32 are same as the shape and size of a cross section of the housing space of the cup lid 20, so as to enable the first mounting plate 32 to be stuck in the housing space and reduce the complexity of installation.

The first mounting plate 32 defines the annular circulation hole 35, and the annular circulation hole 35 is arranged in an arc around a center of the first mounting plate 32 to increase the size of the circulation hole 35 and reduce the resistance of air flow.

The plane in which the second bracket 60 is located is perpendicular to the connection direction between the cup body 10 and the cup lid 20. The shape and size of a cross section of the second bracket 60 are same as the shape and size of a cross section of the housing space of the cup lid 20, so as to enable the second bracket 60 to be stuck in the housing space and reduce the complexity of installation.

Since the cooling member 41 and the heat dissipation member 71 are arranged along the vertical direction, in order to reduce the distance between the cooling member 41 and the air inlet 22 and reduce the distance between the heat dissipation member 71 and the air outlet 23, the air inlet 22 may be defined on the side wall of the cup lid 20 and the air outlet 23 may be defined on the top wall of the cup lid 20, thereby facilitating air intake and heat dissipation.

The advantage of this embodiment over the previous embodiment is that the air inlet 22 may be defined around the circumference along the cup lid 20 facing the cooling member 41 to make the number of air inlets 22 as large as possible, thereby enhancing the air inlet speed and air inlet volume and improving the water storage efficiency of the self-producing water cup 100.

Figure 11:
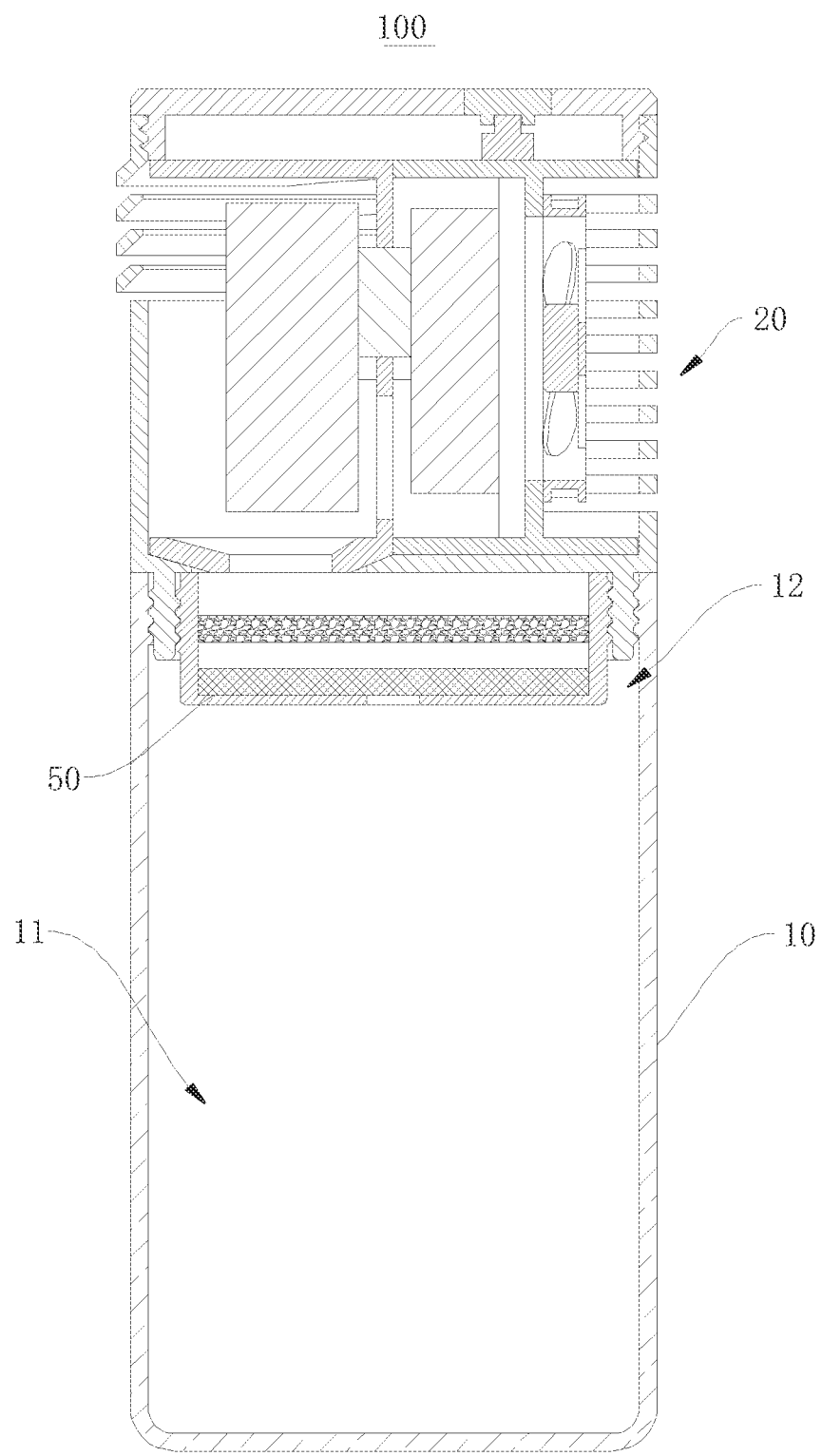
FIG. 11 is a cross-sectional structural schematic view of a self-producing water cup according to an embodiment of the present disclosure.

Based on the cup lid 20 in the above embodiments, the present disclosure also provides a self-producing water cup 100, as shown in FIG. 11, FIG. 11 is a cross-sectional structural schematic view of a self-producing water cup according to an embodiment of the present disclosure. The self-producing water cup 100 includes a cup body 10 and a cup lid 20, the cup body 10 defines a liquid storage chamber 11 and a cup opening 12 communicated to the liquid storage chamber 11. The cup body 10 is removably connected to the cup lid 20.

Specifically, the cup opening 12 is arranged on a side of the cup body 10 toward the cup lid 20, and a housing space with an opening is defined on the side of the cup lid 20 toward the cup body 10.

The self-producing water cup 100 further includes a filter 50, which is arranged on one of the cup lid 20 and the cup body 10 and is arranged upstream of the water outlet 24.

Specifically, in this embodiment, the filter 50 is arranged below the water collection port 31. The filter 50 is configured to filter impurities in the water. The filtered water is discharged through the water outlet 24 and taken up in the liquid storage chamber 11. When there is no need for drinking water, the self-producing water cup 100 works to condense the air to form drinking water. In the need for drinking water, the cup lid 20 can be opened to provide water that can be consumed through the cup body 10, thereby making the self-producing water cup 100 more convenient to use.

In some embodiments, the filter 50 may be adopted with a PP hollow fiber ultrafiltration membrane filter 50, which can effectively remove airborne bacteria. Airborne bacteria, as well as particles larger than bacteria, large organic matter, etc. can be retained by the filter 50.

In other embodiments, the filter 50 may be adopted with a bamboo charcoal filter 50, which can better improve the adsorption capacity of harmful substances in the water, effectively improve the taste, and adjust the PH of water to be weakly alkaline (with PH value of 7.5 to 9.5), such that the water is suitable for drinking. Alternatively, the filter 50 may also be made of materials with other functions, which can be set according to demands.

In some embodiments, the cup body 10 and the cup lid 20 are each in a cylindrical shape. An end of the cup lid 20 toward the cup body 10 is arranged with an internal thread and an external thread. The filter 50 is threaded to the cup lid 20 through the internal thread, and the cup body 10 is threaded to the cup lid 20 through the external thread.

As shown in FIG. 11, the cup lid 20 is in a cylindrical shape, and both the external and internal threads are arranged at an opening of the cup lid 20. An outer side wall of the filter 50 is arranged with an external thread, and the external thread on the filter 50 may be connected to the internal thread on the cup lid 20 to fix the filter 50 to the cup lid 20. The inner thread on the cup body 10 is arranged at an opening of the cup body 10, and the inner thread on the cup body 10 may be connected to the outer thread on the cup lid 20 to fix the cup lid 20 on the cup body 10. In this way, the filter 50 may be connected to the cup lid 20, such that when the cup lid 20 is removed for drinking water, the filter 50 may be avoided to produce obscuration. The cup lid 20 is connected to the cup body 10, such that the cup lid 20 may be configured to seal the liquid storage chamber 11 on the cup body 10 to prevent external impurities from entering the liquid storage chamber 11.

In other embodiments, the filter 50 may be fixed in the cup lid 20 by means of clasping or gluing. The cup lid 20 may be connected to the cup body 10 by means of removable connections such as clasps, etc. For the specific structure of the connection, the present disclosure will not be repeated.

Obviously, the above described embodiments are only a part of the present disclosure, but not all of the embodiments. The preferred embodiments of the present disclosure are given in the attached drawings, but they do not limit the scope of the present disclosure. The present disclosure can be implemented in many different forms, and instead, these embodiments are provided for the purpose of providing a thorough and comprehensive understanding of the present disclosure. Notwithstanding the detailed description of the present disclosure with reference to the foregoing embodiments, it is still possible for those skilled in the art to modify the technical solutions documented in each of the foregoing specific embodiments or to make equivalent substitutions for some of the technical features thereof. Any equivalent structure made by using the specification and the accompanying drawings of the present disclosure, which is directly or indirectly applied in other related technical fields, is also within the scope of the present disclosure.

What is claimed is:

1. A cup lid, applied to a cup having a cup body, wherein the cup lid comprises:

a housing, defining a housing space, an air inlet, an air outlet, and a water outlet; wherein the air inlet, the air outlet, and the water outlet communicated to an outside; the air inlet, the air outlet, and the water outlet communicated to the housing space;

a condensing mechanism, received in the housing and communicated to the air inlet; wherein the condensing mechanism is configured for condensing air flowing from the air inlet into water, and the water flows out through the water outlet, the condensing mechanism comprises a cooling member and a semiconductor cooling sheet, the semiconductor cooling sheet comprises a cold end, the cooling member is in contact with the cold end; and a heat dissipation mechanism, received in the housing and communicated to the air outlet; wherein the heat dissipation mechanism is configured for dissipating heat generated by the condensing mechanism, the heat dissipation mechanism comprises a heat dissipation member, the heat dissipation member comprises a heat dissipation body and a heat dissipation fin arranged on the heat dissipation body, the heat dissipation body is in contact with the semiconductor cooling sheet, the semiconductor cooling sheet further comprises a hot end; the cooling member is above the water outlet, the heat dissipation member is arranged at the hot end, the cup lid further comprises a first bracket arranged on the housing; wherein the condensing mechanism and the heat dissipation mechanism are arranged on the first bracket, the first bracket comprises a first mounting plate, a second mounting plate, and a water collection port defined on the second mounting plate; a plane in which the first mounting plate is located is parallel to a connection direction of the cup body and the cup lid; the second mounting plate is connected to the first mounting plate, and a plane in which the second mounting plate is located is perpendicular to the plane in which the first mounting plate is located; the cooling member is arranged on the first mounting plate.

2. The cup lid according to claim 1, wherein the first mounting plate defines a fixing hole, and the semiconductor cooling sheet is stuck in the fixing hole; the heat dissipation mechanism is arranged on a side of the first mounting plate, and the cooling member is arranged on an opposite side of the first mounting plate; the cooling member and the heat dissipation mechanism are respectively in contact with the semiconductor cooling sheet.

3. The cup lid according to claim 1, further comprising a second bracket and a heat dissipation fan; wherein the second bracket is received in the housing space and the second bracket is on a side of the heat dissipation member; the heat dissipation fan is arranged on the second bracket and the heat dissipation fan faces the heat dissipation member.

4. The cup lid according to claim 1, wherein the cooling member and the heat dissipation member are arranged along a connection direction of the cup body and the cup lid; the air inlet is defined on a side wall of the cup lid, and the air outlet is defined on a top wall of the cup lid; the first bracket defines a circulation hole.

5. The cup lid according to claim 1, further comprising a temperature detector arranged on the cup lid and the temperature detector is adjacent to the heat dissipation mechanism.

\* \* \* \* \*